Oct. 11, 1955
T. HARRISON
2,720,157
TENDERIZER AND COOKER
Filed June 14, 1954
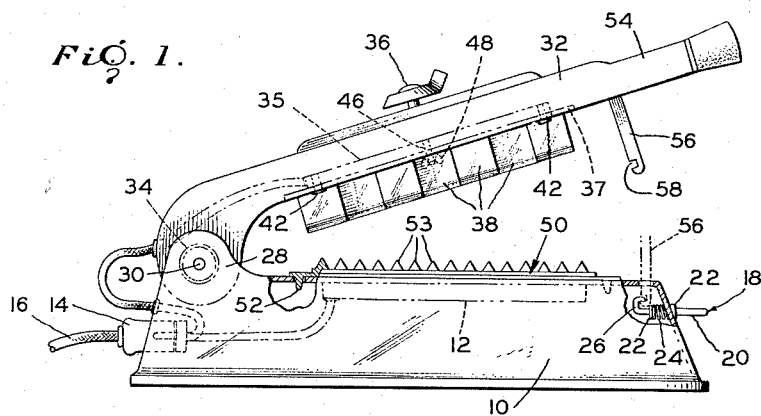
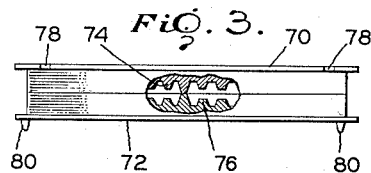
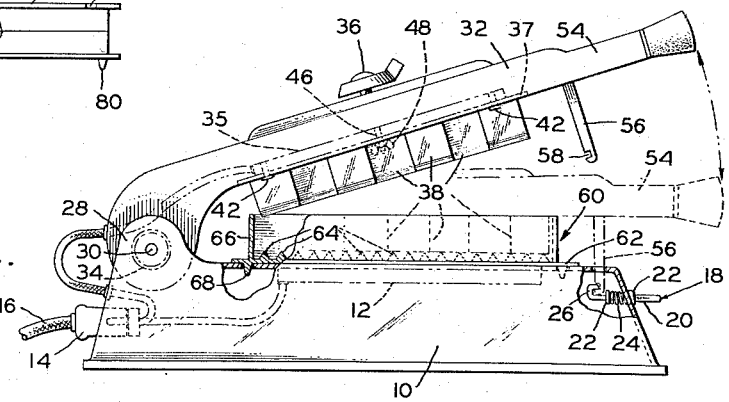
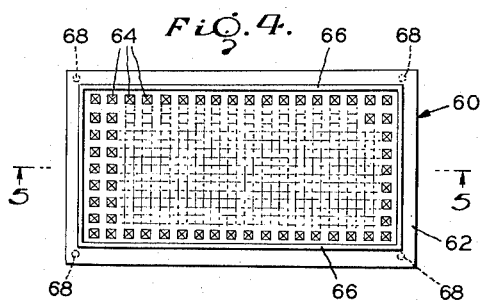
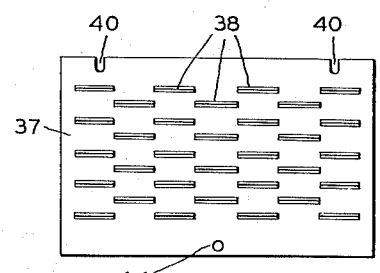
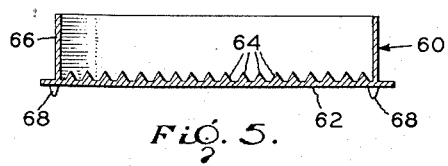
INVENTOR
*Taylor Harrison.*
BY
*Gustav Miller*
ATTORNEY

United States Patent Office 2,720,157
Patented Oct. 11, 1955

2,720,157

TENDERIZER AND COOKER

Taylor Harrison, Fort Worth, Tex., assignor of one-half to Jack Danciger, Fort Worth, Tex.

Application June 14, 1954, Serial No. 436,283

3 Claims. (Cl. 99—353)

This invention relates to an electrically heated cooking device, and more particularly relates to a cooking device which, by minor adjustments, can be used to cook waffles, or can be used to tenderize and cook meats.

The use of an electrical device having grid plates thereon for cooking waffles is common; it is also well known to tenderize meats by disrupting the cellular structure of the meat by perforating it while, at the same time, so crushing the meat as to render it more palatable. However, the device of the present invention is not only capable of cooking waffles and tenderizing meats, but it is capable of tenderizing the meat at the same time that it is being cooked.

It is, therefore, one object of this invention to provide an electrically heated device which is easily convertible from a waffle cooking device to a meat cooking device.

Another object of this invention is to provide an electrically heated device which is adapted to both cook and tenderize meat at the same time.

Another object of this invention is to provide an electrically heated device which is convertible for cooking and tenderizing both thin and thick pieces of meat.

Another object of this invention is to provide an electrically heated device which is adapted to both cook and tenderize meat at the same time, wherein the tenderizing includes means for forming staggered, elongated cuts in the meat.

Other objects of this invention are to provide an electrically heated cooker and tenderizer that is easily and economically produced, which is sturdy in construction, and which is highly effective in operation.

With the above and related objects in view, this invention consists in the details of construction and combination of parts as will be more fully understood from the following description, when read in conjunction with the accompanying drawing in which:

Fig. 1 is a side view, partially in elevation and partially in section, of a device embodying the invention, the device being provided with means adapted to both cook and tenderize thin pieces of meat.

Fig. 2 is a view similar to Fig. 1, but showing the device adapted to cook and tenderize thick pieces of meat.

Fig. 3 is a side view, partly in elevation and partly in section, of an attachment for cooking waffles.

Fig. 4 is a top plan view of the lower grid shown in Fig. 2.

Fig. 5 is a cross-sectional view of the grid of Fig. 4.

Fig. 6 is a bottom plan view of the top plate shown in Figs. 1 and 2.

Referring now in greater detail to the drawing wherein similar reference characters refer to similar parts, there is shown in Figs. 1 and 2 a base 10 provided with an electrical heating means 12 which is adapted to be connected by wires, not shown, to a female socket in the base for receiving the plug 14. The plug 14 is connected through cable 16 to a source of electrical energy.

A latch member 18 is provided at the front end of the base, this latch member comprising a stem 20 extending through the front wall of the base. A stop 22 is provided on the stem on either side of the front wall of the base. A coil spring 24 surrounds the stem and is positioned between the inner stop 22 and the inner surface of the front wall of the base. A hook portion 26 extends up from the inner end of the stem.

At the rear end of the base 10 are provided a pair of ears 28 between which extends a pivot pin 30. A cover 32 is pivotally mounted at one end on pin 30. A torsion spring 34 surrounds the pivot pin and acts to resiliently urge the cover 32 into the open position. An electrical heating element 35 is provided in the cover, and on top of the cover is provided an electrical heat control switch 36 for controlling the temperature of the heating elements on both the base and the cover.

As shown in Figs. 1, 2 and 6, the cover is provided with a plate 37 having a plurality of cutting elements 38 arranged thereon in staggered relationship relative to one another. The plate 36 is also provided with a pair of slots 40 to receive a pair of holding lugs 42 depending from the cover. An opening 44 is provided at the opposite side of the plate to receive a stud 46 depending from the cover. A wing nut 48 secures the stud in the opening 44.

The base, as shown in Fig. 1, is provided with a bottom grid 50 from the corners of which depend lugs 52 adapted to fit into corresponding openings in the base. The grid 50 is also provided with upwardly extending square pointed projections 53 which form the grid network thereon.

The cover 32 is provided with a handle 54 at the front end thereof. Adjacent the handle is a latch member 56 which has a slot 58 adapted to engage with the hook 26 on the latch member 20 when the cover is depressed into closing position. The latch mechanism is kept locked by the spring 24 and is adapted to be released by first pressing down on the handle to release the hook from the slot 58 and then allowing the spring 34 to raise the cover.

In Fig. 2 the base 10 is shown as being provided with a lower grid 60 which comprises a plate 62 provided with square pointed projections 64 enclosed within a rectangular wall 66. Lugs 68 are dependent from each corner of the plate 68 and are adapted to be inserted in a corresponding set of openings in the top of the base, in similar fashion to lugs 52.

In Fig. 3 is illustrated an upper and lower waffle plate as at 70 and 72, these waffle plates being provided with upper and lower projections 74 and 76 in the usual fashion. The upper plate is provided with slots 78 similar to slots 40 and the lower plate is provided with lugs 80 similar to lugs 68.

In operation, when the device is used as a meat cooker, either the plate 50 or 60, depending on the thickness of the meat, is arranged on the base while the plate 37 is attached to the cover. The cover is then brought down on the meat compressing it between the cutting elements on the top plate and the square pointed projections on the lower plate. The cutting elements form elongated shallow cuts in the meat and the projections crush the meat from the bottom, the cutting elements of the top plate extending between the pointed projections on the grid. The staggered, elongated cuts have been found very effective in cutting across the complete cellular structure of the meat while it is being crushed under the pressure of the projections on the lower plate. In the case of a thick piece of meat which is cooked on the lower plate shown in Figs. 2, 4 and 5, the encircling wall 66 aids in the cooking by conducting the heat upwardly. This wall also acts as a retainer for meat juices and to keep the meat from slipping, and in addition, acts as a guide for the cutting elements of the upper plate.

When it is desired to use the device as a waffle cooker, the waffle elements, shown in Fig. 3, are substituted for the upper and lower plates described above, and the waffles are then cooked in the usual manner.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A meat tenderizer-cooking device comprising a base, an electrical heating element in said base, a cover pivoted at one end to said base, a grid plate on said base, a plurality of pointed projections extending upwardly from said grid plate, and a plurality of thin, elongated cutting blades extending downwardly from said cover, said cutting blades being arranged in a series of rows wherein the blades of each row are longitudinally offset from the blades of the rows adjacent thereto.

2. The device of claim 1 wherein said grid plate comprises a relatively flat base, a peripheral wall extending up from said flat base, and a plurality of square pointed projections extending from said flat base to a height substantially below the top of said peripheral wall.

3. A meat tenderizer-cooking device comprising a base, an electrical heating element in said base, a cover pivoted at one end to said base, means urging the free end of said cover to the open position away from said base, means on the free end of said cover and on said base to form a resilient latch means for latching said cover to said base, a plurality of pointed projections on said base, and a plurality of cutting blades on said cover, said blades being arranged in such manner that each blade is laterally and longitudinally offset from the blades adjacent thereto.

References Cited in the file of this patent

UNITED STATES PATENTS

| | | |
|---|---|---|
| 268,736 | Shaw | Dec. 5, 1882 |
| 1,405,043 | Kruesheld | Jan. 31, 1922 |
| 1,790,194 | Amacher | Jan. 27, 1931 |
| 1,910,294 | Kaminski | May 23, 1933 |
| 2,018,698 | Allen | Oct. 29, 1935 |
| 2,031,259 | Fox | Feb. 18, 1936 |
| 2,103,563 | Spang | Dec. 28, 1937 |
| 2,186,807 | Neuberger | Jan. 9, 1940 |
| 2,214,872 | Barnes | Sept. 17, 1940 |
| 2,309,641 | Gough | Feb. 2, 1943 |

FOREIGN PATENTS

| | | |
|---|---|---|
| 224,904 | Great Britain | June 11, 1925 |